United States Patent Office 3,414,561
Patented Dec. 3, 1968

3,414,561
PROCESS FOR THE MANUFACTURE OF HYDROXOCOBALAMINE FROM CYANOCOBALAMINE
Jean Boige, 53 Ave. Vercingetorix, Aulnay-sous-Bois, Seine St-Denis, France
No Drawing. Filed May 13, 1966, Ser. No. 549,815
Claims priority, application France, May 21, 1965, 17,936
9 Claims. (Cl. 260—211.7)

ABSTRACT OF THE DISCLOSURE

Cyanocobalamine is converted to hydroxocobalamine by establishing a solution of cyanocobalamine and an ionizable ferrous salt, the solution having a pH between 3 and 5 and an oxidative potential. A strong base is gradually added until the pH is about 6.2 and the solution changes to a reducing solution. Upon reduction of the cobalt, the cyanide groups are precipitated as ferrous ferrocyanide and the precipitate is removed. Thereafter, the cobalt is oxidized to produce hydroxocobalamine, by bubbling an oxidizing gas through the solution. In this way, uncontrolled reduction and degradation of cobalamine are avoided.

This invention relates to a process for the industrial manufacture of hydroxocobalamine starting from cyanocobalamine.

Cyanocobalamine (or vitamin $B_{12}$) has a cyano CN group in an organic molecule of complex structure. A description of the $B_{12}$ vitamin will be found, together with its complete formula and an account of its properties, in for instance, the "Merck Index," 1960 edition, page 1098.

There is a tendency today to prefer hydroxocobalamine, often termed vitamin $B_{12b}$ to the abovementioned substance for pharmaceutical purposes.

The formula of hydroxocobalamine derives from that of cyanocobalamine by replacing the cyano group by a hydroxy group.

As a matter of fact, hydroxocobalamine which has basic properties, enters more easily into the metabolism of human beings.

Various processes are already known which make it possible to convert the vitamin $B_{12}$ to the vitamin $B_{12b}$. For instance, in a known method the first thing is to eliminate, in an acid medium, the $CN^-$ of the cyanocobalamine molecule and to replace it by another anion such as $Cl^-$, after which the ester thus obtained in converted to hydroxocobalamine.

However, this first reaction only gives a very low yield, as cyanocobalamine is practically non-ionisable, so that the process is not particularly interesting from the industrial viewpoint.

In another known method, a catalytic hydrogenation of the cyanocobalamine is carried out to transform it to cobalamine, which is then oxidized to obtain hydroxocobalamine.

However, in this process, the reaction yield depends in part on the catalyst the efficancy of which can vary in time and at each operation. Moreover, the cobalamines remain in the presence of hydrogen for an appreciable time, which is undesirable as will be explained later.

A third known technique which also consists of an hydrogenation followed by an oxygenation provides for the hydrogenation by the hydrogen nascent in solution of cyanocobalamine.

In particular a process is known which consists in making an hydracid to react on a divalent salt which becomes trivalent with the liberation of hydrogen in the presence of the cyanocobalamine. For example hydrochloric acid can be made to react on ferrous chloride or sulphuric acid on sodium bisulphite. After elimination of the precipitate formed, the solution is reoxidized by bubbling with air.

This process, which constitutes an improvement by comparison with that previously described, presents, nevertheless, the disadvantages of leaving the cobalamines in the presence of hydrogen for an appreciable time.

It has also been proposed to effect the reduction by adding a metal, for example, iron or zinc, to an acid solution of cyanocobalamine. In any case this process is without any industrial interest as the amounts of acid and metal foreseen give a pressure of hydrogen insufficient to produce the hydrogenation required. There is not, therefore a noticeable yield. In addition this process involves agitation of the reactants which makes it difficult to obtain reproducible operations.

In the technique in accordance with the U.S. Patent 3,138,583 the hydrogenation is assured by passing a mixture of a solution of an hydracid and cyanocobalamine through a column of granulated zinc, the resulting solution being immediately reoxidized by bubbling air.

This process brings an important improvement with regard to that described in the particular process above referred to as the hydrogenation here is carried out continuously, so that the hydrogenated product does not remain in the reducing medium which considerably limits the risks of degradation of the cobalamines.

However, even in this very interesting process, some irregularities may arise due to the fact that the hydrogenation varies with the speed of the passage of the liquid through the mass of zinc, and with the degree of granulation and quality of the zinc. It is therefor necessary to regulate all the factors from one piece of apparatus to another.

In all the techniques comprising the action of an acid on a metal and the liberation of gaseous hydrogen, the rH of the solution to be hydrogenated can be considered as zero.

In fact the rH is the measure, as is known, of the oxydo-reduction potential of a solution, and its value is 0 in the case of free hydrogen at atmospheric pressure and is 41 for free oxygen at atmospheric pressure, inactivity being obtained substantially for rH 20.5. The rH value thus gives the measure of the reducing or oxidizing power of a solution.

Now the fact that in the abovementioned processes the rH is zero shows that the reducing power of the solution cannot be controlled. This means that there is a risk that the hydrogenation may be carried on further than is wished, which can involve a degradation of the cobalamine molecule.

The process in accordance with the present invention is directed to overcoming the drawbacks of the abovementioned processes by making it possible to effect the desired transformation of cyanocobalamine to hydroxocobalamine under optimum conditions, particularly as regards the reducing power of the hydrogenating medium used.

According to the invention the process of industrial manufacture of hydroxocobalamine by reduction of cyanocobalamine in solution followed by its oxidization is characterized in that the reduction is effected by producing a mixture of the solution of cyanocobalamine and a ferrous salt ionizable in an aqueous solution, the pH of the resulting solution being between 3 and 5, then gradually adding to this solution a strong base so as to bring the pH to a value above 6.2 which causes precipitation as ferrous ferrocyanide of the CN group of the cyanocobalamine.

In this process, not only is the rH controlled at will, which permits not a partial hydrogenation but a controlled ionisation, and in addition a complete reaction is obtained by the fact that the CN group is eliminated in the form of the insoluble ferrocyanide salt in proportion to its liberation.

Hence, the equilibrium is completely displaced without having had to undergo a strong reducing action which could attack certain parts of the complex molecule which forms the cobalamines.

It is further found that above pH 6.2–6.5, the solution which was red changes color and becomes maroon, at the same time as the ferrocyanide precipitates. The reaction is practically immediate. If filtration is carried out and the cyanide is titrated by the most sensitive methods which can show for example 0.3 gamma per litre of solution, the rest remains negative, which means a quantitative reaction due to the elimination by precipitation of one of the equilibrium factors (the ionized cyano-group which passes to the ferrocyanide state).

The change in color observed indicates the passage of the cobalt of the cyanocobalamine from the trivalent condition to the bivalent condition, or else from the oxidized form to the reduced form. Finally, it will be noted that the transformation thus obtained corresponds to the ionization of the whole of the cyanocobalamine.

Preferably the pH of the original comprising the cyanocobalamine and the ionizable ferrous salt is substantially between 3.2 and 4.5 while the neutralization of the initial solution by the strong base is carried on until a pH is reached of at least 7.2 and which may even reach without inconvenience 9 to 9.5 this making it possible to precipitate all the ferrous ferrocyanide.

Advantageously, the cyanocobalamine is used in an aqueous solution with a concentration of between 2,000 and 15,000 gamma per ml., the ionizable ferrous salt consisting of ferrous chloride or ferrous sulphate, in such a quantity that the concentration of ferrous salt of the resulting solution is substantially between $\frac{1}{40}$ and $\frac{1}{5}$ mols per litre. It must however be emphasized that the ferrous salt concentration may vary within very wide proportions without notably affecting the yield. Nevertheless it is advantageous to add the minimum of ferrous salt necessary, so as to facilitate subsequent purification.

The strong base used to raise the pH preferably consists of a solution of caustic soda or of potash or of lime or of caustic baryta use of ammonium is not recommended because it may cause the formation of complexes.

As there is an ionisation followed by a precipitation, the reaction is immediate and the product formed does not remain a long time in the presence of a reducing agent. The reaction of the ferrous sulphate and of the baryta allows insoluble ferrous oxide and barium sulphate to form so that there only finally remains in solution hydroxocobalamine with very little salts. Furthermore, the fact of eliminating the iron salts by addition of a strong base has as a consequence that, once in an alkaline medium at a pH of 9.5 to 10, practically no ferrous salts remain in solution. The reducing power has therefore practically disappeared and there is no risk of spoiling the product formed.

After having reached a pH value of 7.2 to 8.0, the invention provides two methods of continuing the process.

In the first method, the addition of the strong base is continued until the pH reaches a value substantially between 8.5 and 9. This causes the precipitation of ferrous salts in excess. The composite precipitate formed by the ferrocyanide and the ferrous salt in excess which has been brought into a pH range where it is no longer soluble, is than separated by filtration. The dosage of iron in the filtrate collected remains negative.

There is then bubbled into this filtrate an oxidizing gas such as air, which brings the cobalt of the cobalamines of valency 2 to the valency 3 or in other words causes the formation of hydroxocobalamine. It is further found that the solution becomes red again. This transformation is facilitated if, beforehand, the pH is brought to a value substantially between 5 and 6 by the addition of an acid in solution, such as hydrochloric acid or sulphuric acid.

If the photometric spectrum of the solution obtained is determined, it is found that this corresponds very well to that of hydroxocobalamine. The content of cyanide and of iron, even determined by the finest methods, remains negative.

The hydroxocobalamine is then separated from the solution by known methods, such as chromatography followed by crystallization. Pure hydroxocobalamine is thus obtained.

In the second method, the solution of cyanocobalamine with the addition of ferrous salt having been brought to a pH substantially between 7.2 and 8 by the addition of the strong base, a first filtration is carried out so as to eliminate the ferrous ferrocyanide precipitate, the filtrate is oxidized by bubbling in an oxidizing gas, after which a second filtration is carried out to eliminate the precipitate of ferric salts resulting from the preceding oxidization, after which the separation of the hydroxocobalamine is carried out in manner known per se.

In this mode of embodiment it is necessary to continue further the oxidization of the solution by bubbling in oxidizing gas. This result can be achieved by using, for instance, oxygen instead of air.

The following explanation can be offered for the process in accordance with the invention, without however the invention being bound by this explanation.

The reaction between ferrous chloride $FeCl_2$ and cyanocobalamine represented by lthe formula:

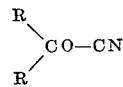

(where R designates an organic group and where the cobalt is therefore trivalent) would appear to correspond to the following overall reaction:

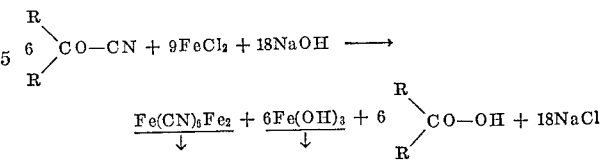

This reaction may be split up into a succession of elementary reactions. In the presence of soda, the ferrous chloride added to the original solution gives ferrous hydroxide:

$$FeCl_2 + 2NaOH \rightarrow NaCl + Fe(OH)_2$$

The ferrous hydroxide tends to hydrolize into ferric hydroxide which precipitates if the pH value exceeds 2.2:

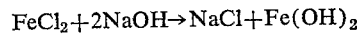

The cyanocobalamine thus being in a reducing medium passes to the cobalamine state:

(a)

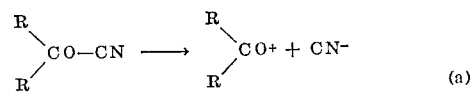
(1)

The hydrocyanic acid reacts with the ferrous hydroxide to give ferrous ferrocyanide, a very stable complex which precipitates as from a pH value of 6.2; precipitation being complete towards 7.2 or more:

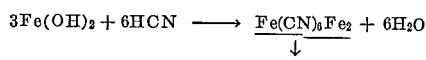

The precipitation of ferrous ferrocyanide thus causes a permanent displacement of the equilibrium of the above-mentioned reactions (a) and (b).

The oxidization by bubbling in air transforms the cobalamines into hydroxocobalamine:

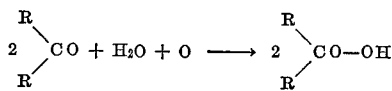

If, by the addition of soda the pH value is raised above 8.5 in accordance with the first embodiment of the process, the precipitation is caused of ferrous hydroxide $Fe(OH)_2$, which is insoluble in this pH range.

In the second embodiment, this precipitation is effected by transforming ferrous hydroxide into ferric hydroxide according to the reaction:

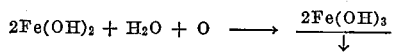

Study of the potentials of oxido-reduction has further shown by way of confirmation that the passage of the pH value of the resulting solution (cyanocobalamine +ferrous salt) from a value between 3 and 5 to a value above 6.2 by the addition of the strong base is accompanied by a passage of the rH through an equilibrium value of about 21.5 for a pH value of 6.2, the rH corresponding to an oxidizing medium for very low values of pH and to a reducing medium for higher values. Thus with a pH value of 4 there is an rH of 30.3, while with a pH of 8.5 there is an rH of 8.6.

The invention will be illustrated by the following examples:

Example 1.—48 g. of cyanocobalamine are dissolved in 6 litres of water, which corresponds to a concentration of about 8,000 gamma per ml. of cyanocobalamine.

64 g. of ferrous chloride are added in the crystalline state, while stirring. The crystals dissolve immediately and a solution is obtained of about 1/12 mol per liter. The pH value of the initial solution thus obtained is 3.4. The solution remains red and apparently no reaction takes place.

There is added to the initial solution a normal soda solution. The stirring is continued and the pH is constantly watched. The pH value increases and from pH of 6.2 the solution changes colour and becomes maroon (which corresponds to the passage of the cobalamines from the trivalent form to the bivalent form) and a precipitation of ferrous ferrocyanide is observed.

The addition of soda is continued to a pH value of 7.5. The mixture is left for 10 minutes without stirring and then more soda is added up to a pH value of 8.8. Precipitation of ferrous salts in excess is then observed.

Filtration is carried out so as to isolate the precipitate and there is added to the filtrate a little amount of acid (preferably hydrochloric acid or sulphuric acid) so as to bring the pH to a value of 5.5–6.

The solution is then aerated by bubbling in an oxidizing gas such as air for 15 minutes. The solution becomes red again and its spectrum analysis shows that it has the characteristic features of hydroxocobalamine. There is added to this solution 80% acetone and then it is chromatographed on alumina and eluted with 50% acetone. The heart thus obtained is crystallized by the addition of acetone and kept for 24 hours at a reduced temperature (about 5° C.).

There is thus obtained 40 g. of fine crystals whose spectra in an acid and basic medium correspond to that of pure hydroxocobalamine. Furthermore, the pH curve shows the buffer zone characteristic of the basic function of hydroxocobalamine between pH of 6.2 and 8.4.

The most sensitive research tests for cyanide and iron remain negative.

Example 2.—24 g. of cyanocobalamine are dissolved in 6 litres of water. 50 g. of hydrated ferrous sulphate are added, substantially corresponding at the end to the addition of a solution of 1/40 mol per litre. The pH value of this solution is 4.2.

During agitating, a normal potash solution is added, while watching the pH value. From pH of 6.4–6.5 the solution changes colour and ferrous ferrocyanide begins to precipitate.

The addition of potash is continued up to a pH of 8 and then the solution is left for 10 minutes while stirring after which potash continues to be added up to a pH of 8.5–9 which completes the precipitation of ferrous salts in excess. Filtration then takes place after which the pH of the filtrate is brought up to about 5.5 and air is bubbled in for 20 minutes.

The solution thus treated is chromatographed on alumina and then crystallized. After separation off to the crystals and drying, 19 g. of hydroxocobalamine are obtained.

Example 3.—60 g. of cyanocobalamine are placed in solution in 6 litres of water, corresponding to a concentration of about 10,000 gamma per ml.

There are added, while stirring 50 g. of ferrous chloride in the form of crystals which dissolve immediately. The concentration of the solution obtained is about 1/15 mol per litre and its pH value is 3.5. The solution remains red.

Continuing stirring and watching the pH value, a normal soda solution is added. The pH value rises above 6 and the solution then changes colour: from red it becomes maroon. The addition of soda is continued to a pH value of 7.9 and it is then stirred for 10 minutes. Ferrocyanide precipitates.

Filtration is carried out so as to eliminate the ferrocyanide precipitate and the solution is oxidized by bubbling in gaseous oxygen for 10 minutes. The ferrous oxides are then transformed to ferric oxides which precipitate and the cobalamine again passes from a valency of 2 to a valency of 3, giving hydroxocobalamine. Filtration is again carried to separate the precipitate of ferric salts and then, to the solution obtained, there is added acetone and chromatography is carried out on alumina as in Example 1. The product obtained is crystallized at pH 9.47 g. of fine pure hydroxocobalamine crystals are thus obtained.

Example 4.—240 g. of cyanocobalamine are dissolved in 60 litres of water with 600 g. of ferrous sulphate $7H_2O$, the pH obtained is 3.8. Whilst stirring baryta is added slowly while the pH is checked. It is observed that at pH 8 there is a heavily buffered zone corresponding to the precipitation of ferrous oxides.

After addition of 700 g. of baryta the pH is 9.9–10. Filtration is carried out and the pH of the liquid obtained is 9.2.

Sulphuric acid is added up to pH 5 and the solution is aerated.

After chromatography and crystallization, 190 g. of pure hydroxocobalamine are obtained.

Example 5.—50 g. cyanocobalamine are put into solution in 6 litres of water with 50 g. of ferrous sulphate $7H_2O$.

Whilst stirring lime is slowly added following the rise of the pH.

Once more at pH 8 it is observed that the zone is heavily buffered corresponding to the precipitation of the ferrous oxide.

Lime is still added until a pH of 9.9–10 is obtained. Filtration is carried out. The pH of the liquid obtained is 9.3.

Sulphuric acid is added up to pH 5 and it is aerated to reoxidize the cobalamines.

The liquid is refiltered to remove the calcium sulphate precipitated, then chromatography and crystallization are carried out by the usual techniques. 46 g. of hydroxocobalamine are obtained.

It is thus found that the process of the invention makes it possible to effect the transformation with an excellent yield of cyanocobalamine into hydroxocobalamine and without involving a catalyst, metallic powder or gaseous release. The reaction can therefore be carried out very quickly and easily with very simple equipment. Furthermore it has a high yield per hour.

What I claim is:

1. A process for the industrial manufacture of hydroxocobalamine from cyanocobalamine, consisting essentially of establishing an aqueous solution of cyanocobalamine and an ionizable ferrous salt, said solution having an rH above about 20.5 and a pH between 3 and 5, gradually adding to said solution a strong inorganic base selected from the class consisting of caustic soda, potash, baryta and lime until the rH of the solution is below about 20.5 and the pH is above about 6.2 thereby to precipitate from the solution the CN groups of the cyanocobalamine as ferrous ferrocyanide, separating the precipitate from the solution, and thereafter bubbling an ozidizing gas through the solution.

2. A process as claimed in claim 1, the initial pH of the solution being between 3.2 and 4.5.

3. A process as claimed in claim 1, the pH of the solution after addition of the strong inorganic base being between 7.2 and 10.

4. A process as claimed in claim 1, said ionizable ferrous salt being ferrous chloride.

5. A process as claimed in claim 1, said ionizable ferrous salt being ferrous sulfate.

6. A process as claimed in claim 1, and continuing the addition of the strong inorganic base until the pH reaches a value between 8.5 and 10 thereby to precipitate from the solution all ferrous compounds including ferrous ferrocyanide, separating said precipitated compounds from the solution, and adding to the remaining solution a strong inorganic acid selected from the class consisting of hydrochloric acid and sulfuric acid until the pH of the solution is between 5.5 and 6 before said oxidizing gas is bubbled through the solution.

7. A process as claimed in claim 1, and continuing the addition of said strong inorganic acid until the pH of the solution is between 7.2 and 8 so that upon subsequent bubbling of the oxidizing gas iron in excess of that which precipitated and was removed as ferrous ferrocyanide is precipitated as ferric hydroxide, and performing a second separation to separate said ferric hydroxide from the remaining solution.

8. A process as claimed in claim 1, characterized in that the cyanocobalamine is used in an aqueous solution with a concentration between 2,000 and 15,000 gamma per ml.

9. A process as claimed in claim 1, characterized in that the concentration of ionizable ferrous salt is between $\frac{1}{40}$ and $\frac{1}{5}$ mol per litre.

References Cited

UNITED STATES PATENTS 3,138,583  6/1964  Boige et al. _____ 260—211.5

FOREIGN PATENTS 1,286,143  1/1962  France.

LEWIS GOTTS, *Primary Examiner.*

JOHNNIE R. BROWN, *Assistant Examiner.*